United States Patent [19]

Knodt et al.

[11] Patent Number: 5,365,349
[45] Date of Patent: Nov. 15, 1994

[54] IMAGE DELETION FOR IMPROVED SCANNER FAULT RECOVERY

[75] Inventors: Kurt T. Knodt, Rochester; Herbert J. Raymor, Holcomb; Gerald L. Coy; Randall P. Cole, both of Rochester, all of N.Y.

[73] Assignee: Xerox Corporation, Rochester, N.Y.

[21] Appl. No.: 150,327

[22] Filed: Nov. 9, 1993

Related U.S. Application Data

[63] Continuation of Ser. No. 589,622, Sep. 28, 1990, abandoned.

[51] Int. Cl.⁵ .................................................. H04N 1/00
[52] U.S. Cl. ..................................... 358/406; 358/401; 358/437; 358/444; 355/308
[58] Field of Search ............... 358/401, 404, 405, 406, 358/437, 444, 445, 447, 475, 494; 355/207, 308, 319, 320

[56] References Cited

U.S. PATENT DOCUMENTS

| | | |
|---|---|---|
| 3,903,517 | 9/1975 | Hafner ............................ 382/57 |
| 4,130,354 | 12/1978 | Steiner .......................... 355/3 R |
| 4,163,897 | 8/1979 | Hubbard et al. ............... 355/14 |
| 4,206,996 | 6/1980 | Clark et al. . |
| 4,229,100 | 10/1980 | Travis . |
| 4,377,993 | 5/1982 | Gauronski et al. ............. 355/207 |
| 4,438,459 | 3/1984 | Levine ........................... 358/406 |
| 4,674,065 | 6/1987 | Lange et al. .................. 382/57 |
| 4,748,513 | 5/1989 | Yamada ......................... 358/444 |
| 4,849,821 | 7/1989 | Allen et al. .................... 358/406 |
| 4,914,709 | 4/1990 | Rudak ........................... 382/57 |
| 4,974,260 | 11/1990 | Rudak ........................... 382/57 |
| 5,050,004 | 9/1991 | Morton, Jr. ................... 358/405 |
| 5,132,808 | 7/1992 | Higuchi et al. ................ 358/444 |
| 5,148,286 | 9/1992 | Knodt et al. .................. 358/437 |

FOREIGN PATENT DOCUMENTS

0376473 7/1990 European Pat. Off. .
2166619 5/1986 United Kingdom .

*Primary Examiner*—Edward L. Coles, Sr.
*Assistant Examiner*—Thomas L. Stoll
*Attorney, Agent, or Firm*—Oliff & Berridge

[57] ABSTRACT

Scanner fault recovery in an electronic reprographic system includes monitoring the scanner for faults and enabling deletion from memory any images corresponding to documents involved in the scanner fault. Once the images have been deleted, refeed instructions are displayed to the operator for refeeding the documents whose images were deleted. Upon document refeed, the documents are rescanned for completion of scanning of the job.

8 Claims, 11 Drawing Sheets

FIG. 7

IMAGE DELETION FOR IMPROVED SCANNER FAULT RECOVERY

This is a continuation of U.S. application Ser. No. 07/589,622 filed Sep. 28, 1990, now abandoned.

CROSS-REFERENCE TO RELATED APPLICATION

This application is related to U.S. patent application Ser. No. 07/589,541, entitled "Method and Apparatus for Operating an Electronic Reprographic Printing System Upon Detection of a Scan Interruption", filed Sep. 28, 1990, now U.S. Pat. No. 5,148,286 (JAO 26234), the disclosure of which is incorporated by reference herein.

BACKGROUND OF THE INVENTION

1. Field of the Invention

The present invention relates to a system of electronic reprographics and, more particularly, to a system of electronic reprographics in which scanned images are deleted from memory upon detection of a scanner fault.

2. Description of the Related Art

In light lens printing systems, a lamp or flashing unit flashes light on a document and has an image created synchronously on a photoreceptor belt. The photoreceptor belt picks up toner from which a copy is made.

In electronic reprographic printing systems, a document or series of documents comprising at least one print job are successively scanned. Upon scanning of the documents, image signals are obtained and electronically stored. The signals are then read out successively and transferred to a printer for formation of the images on paper. Once a document is scanned, it can be printed any number of times or processed in any number of ways (e.g., words deleted or added, image magnified or reduced, etc.). If a plurality of documents comprise a job which is scanned, the processing or manipulation of the scanned documents can include deletion of one or more documents, reordering of the documents into a desired order, or addition of a previously or subsequently scanned document or documents.

For a variety of reasons, operation in an electronic reprographic system can be interrupted. This can be the result of a scanner or printer fault, hardware or software faults, paper misfeed, intentional interruption, memory loss, etc. Upon such an interruption due to scanner fault, the operator, not knowing precisely where the scanner ceased operation, must either scan the entire job over again, initiate scanning at a document believed to precede the last scanned document and remove duplicate sheets from the job, or proof what has been scanned so far. Because the image signals are electronically stored immediately after scanning, a scanner fault can result in incomplete, erroneous, blank, etc. images being retained in memory. When a crash occurs while the scanner is building a job, documents present in the paper path can be damaged and the integrity of the job cannot be guaranteed.

Copending U.S. patent application Ser. No. 07/589,541, now U.S. Pat. No. 5,148,286 discloses a method and apparatus for operating an electronic reprographic printing system upon detection of a fault. The application describes the recovery operation upon detection of a fault. The operator is advised of precisely where to re-initiate scanning upon detection of a scanner fault so that the integrity of the job is guaranteed. Instructions are further provided regarding clearance of the paper path in response to the interruption of scanner operation so as to prevent document damage.

Other related art discloses printing systems which perform job recovery upon detection of a scanner fault.

U.S. Pat. No. 4,130,354 to Steiner discloses a reproduction machine having duplex job recovery capabilities which adjusts a reproduction process in the event of a fault condition so that the required number of copies are ultimately produced even though some may have been lost due to the fault. Counters are used to track the two sides of the copies made in a job. If, at the end of a job, these counters are not equal to one another or to the amount of copies requested, the reproduction process is automatically adjusted to correctly produce the required copies.

U.S. Pat. No. 4,206,996 to Clark et al. discloses a job recovery method and apparatus. During a duplex production run, if a fault or jam is detected, recovery is effected by 1) removing the jam; 2) inserting blank sheets as the job is continued to flag the position of each jammed copy in the generated stack of paper; 3) rerunning the original through the copy device after completion of the initial run, only copying necessary copies needed to replace the jammed copies; and 4) inserting the new replaced copies in the initial run stack, thus replacing the blank inserted flag sheets to provide a complete job.

U.S. Pat. Nos. 4,229,100 to Travis and 4,163,897 to Hubbard et al. disclose an automatic copy recovery method which recovers from loss of copy sheets due to a jam or other stoppage. A first flag is set when images are to be copied to both sides of a copy sheet and a second flag is set after first side copies are made. A plurality of separate counts of copy sheets are made. From the counts and the flag settings, recovery can be provided with accurate billing.

U.S. Pat. No. 4,327,993 to Gauronski et al discloses a method and apparatus for performing job recovery in a reproduction machine which reprimes or adds to copy sheets already in a tray to make up for damaged or lost copies without having to reject a whole set of copies.

While the related art attempts to recover from scanner faults by replacing faulted documents, the art does not suggest any type of job recovery which can be used in an electronic printer which stores electronic images in memory. Such systems are unique in that once the documents are initially scanned, the document images are converted to electronic images for storage in memory. Sheet replacement is not sufficient to adequately recover from a detected scanner fault.

OBJECTS AND SUMMARY OF THE INVENTION

Accordingly, one object of the present invention is to provide an electronic reprographic system which deletes from memory any images stored from documents involved in a scanner fault.

Another object of the present invention is to provide an electronic reprographic system which performs consistent recovery by instructing the operator to refeed a document in the paper path upon a misfeed occurrence so that the documents can be rescanned, thereby effecting complete scanning of the job and ensuring job integrity.

A further object of the present invention is to provide an electronic reprographic system which provides improved output quality by automatically deleting questionable images.

To achieve the foregoing and other objects and advantages, and to overcome the shortcomings discussed above, an electronic reprographic system for printing a job is provided which detects any interruption in the operation of the scanner. Upon detection of a scanner fault, the system can delete all stored images related to scanned documents involved in the fault. The system then instructs the operator to refeed the documents so that the documents whose images have been deleted from memory can be rescanned.

BRIEF DESCRIPTION OF THE DRAWINGS

The invention will be described in detail with reference to the following drawings in which like reference numerals refer to like elements and wherein:

FIGS. 5A, 5B, and 5C comprise a schematic block diagram showing the major parts of the control section for the printing system shown in FIG. 1;

FIG. 7 is a view depicting an exemplary job programming ticket and job scorecard displayed on the User Interface (UI) touchscreen of the printing system shown in FIG. 1.

DETAILED DESCRIPTION OF THE PREFERRED EMBODIMENTS

A. The System

Figure 1:
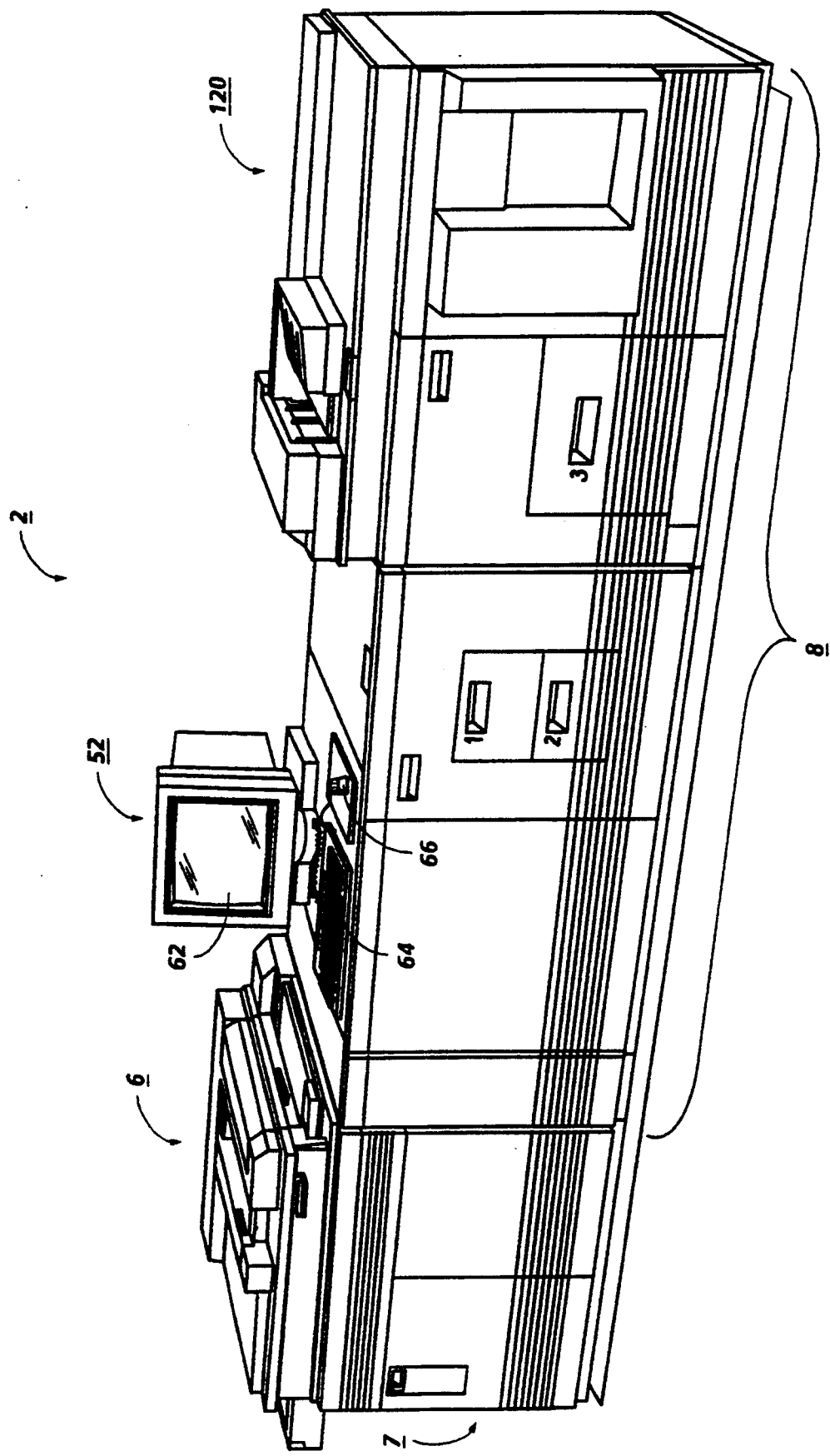
FIG. 1 is a view depicting an electronic printing system incorporating the image deletion feature of the present invention.
Figure 2:
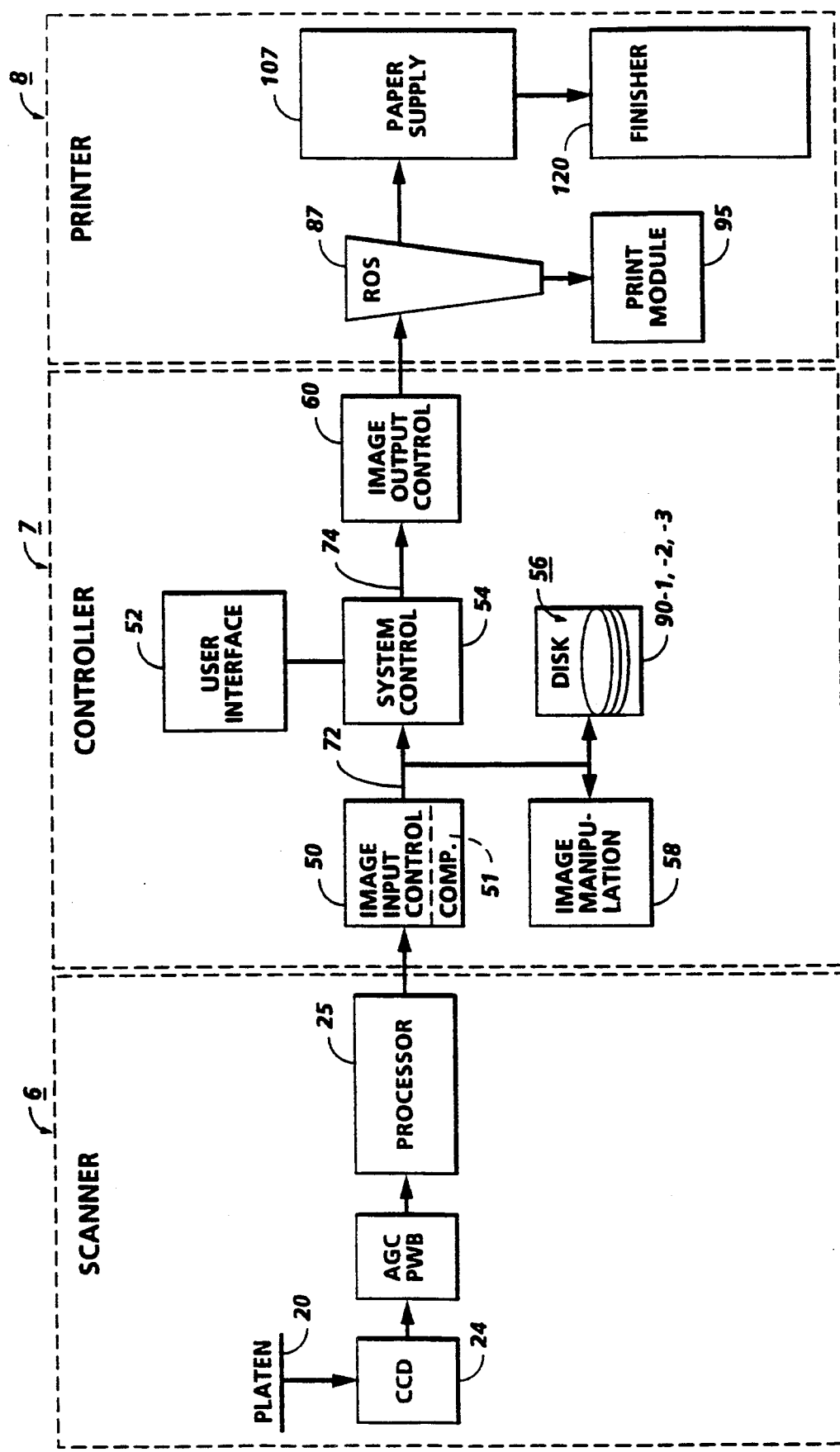
FIG. 2 is a block diagram depicting the major elements of the printing system shown in FIG. 1.

Referring now to the drawings, and particularly to FIGS. 1 and 2 thereof, there is shown an exemplary laser based printing system 2 for processing print jobs in accordance with the teachings of the present invention. Printing system 2, for purposes of explanation, is divided into a scanner section 6, controller section 7, and printer section 8. While a specific printing system is shown and described, the present invention may be used with other types of printing systems such as ink jet, ionographic, etc.

Figure 3:
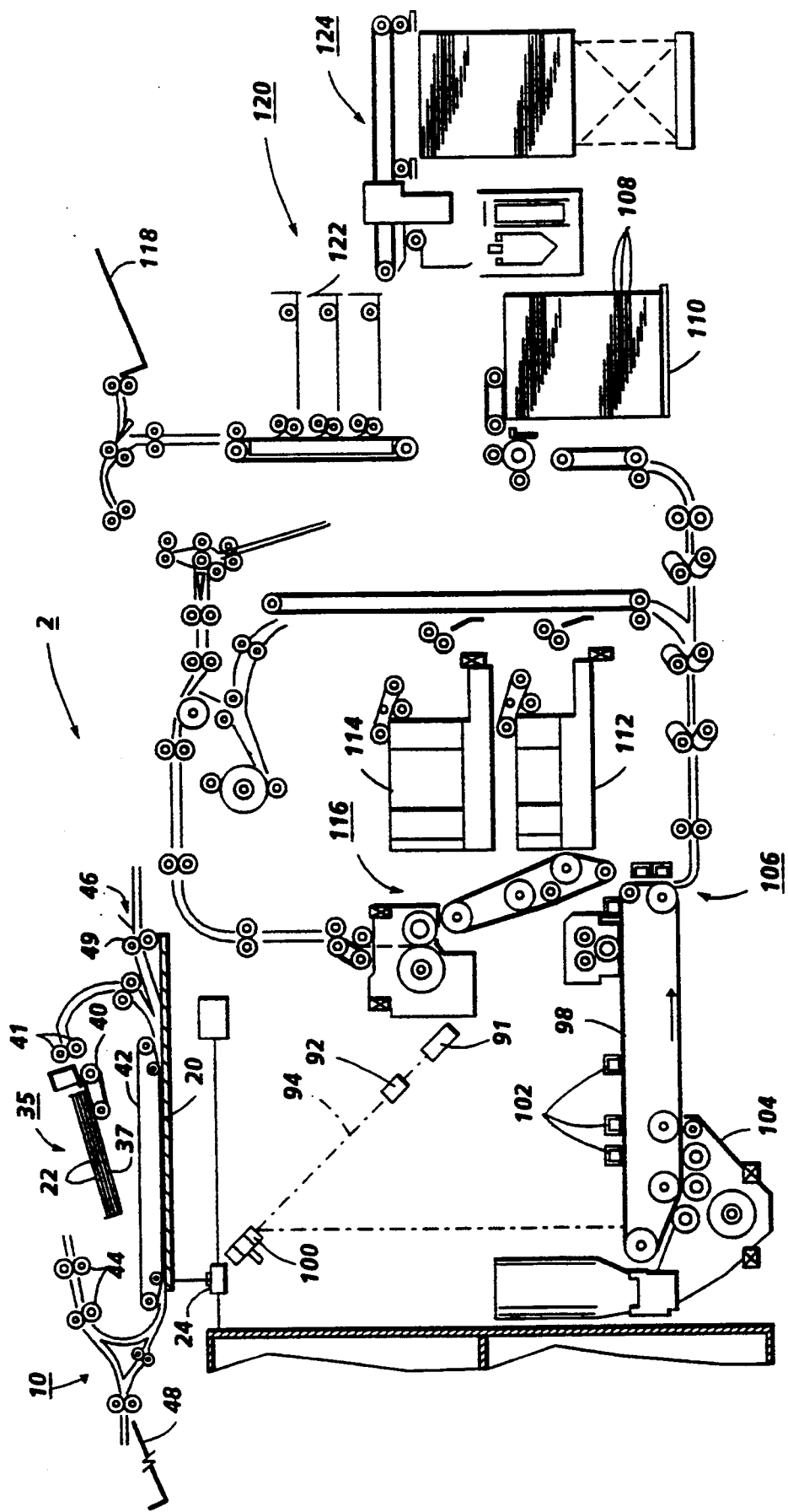
FIG. 3 is a plan view illustrating the principal mechanical components of the printing system shown in FIG. 1.
Figure 4:
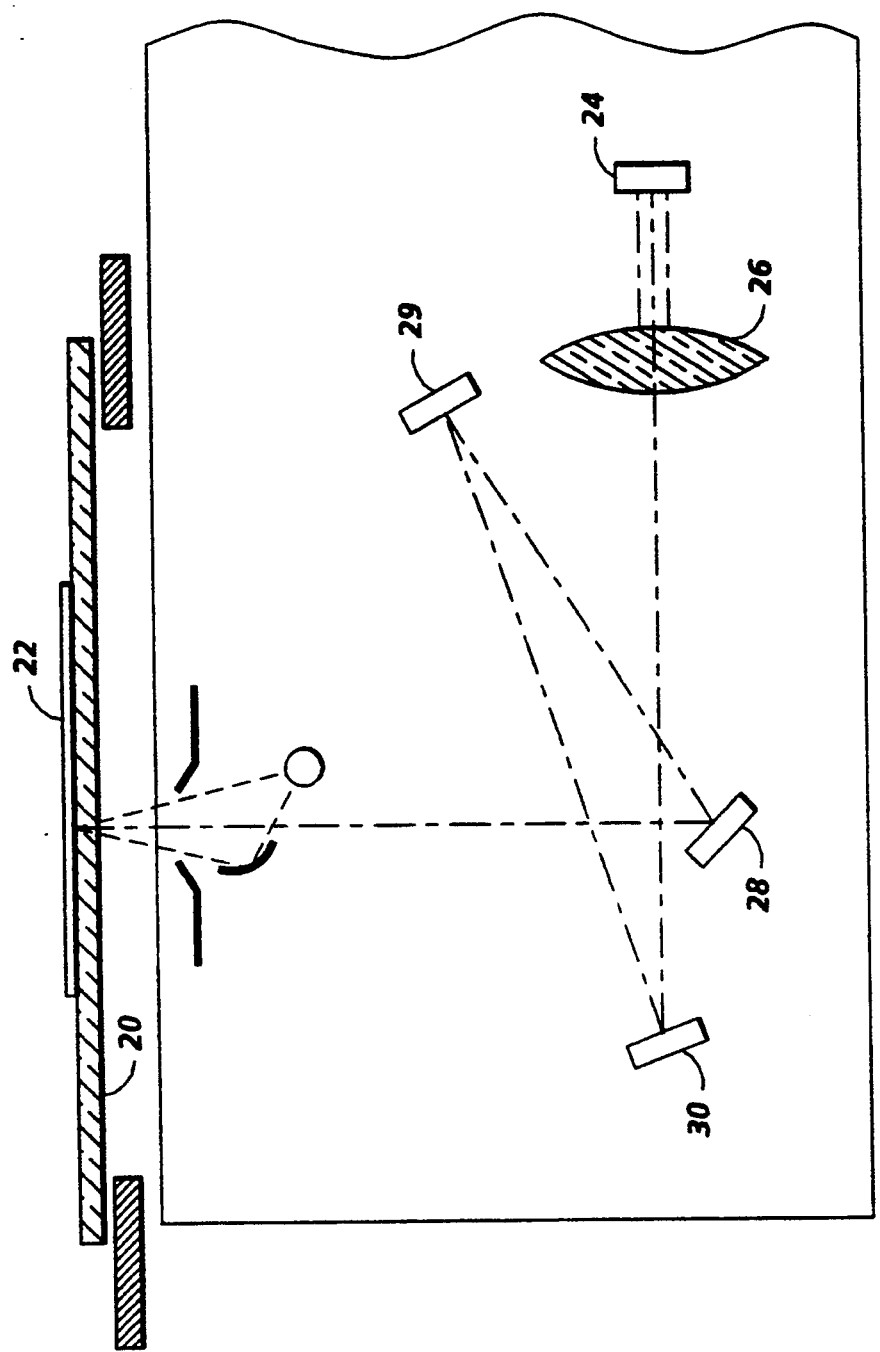
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which, after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40, document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and, for purposes of explanation, is separated into a Raster Output Scanner (ROS) section 87, Print Module Section 95, Paper Supply section 107, and Finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main Paper tray 110 or from auxiliary Paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Figure 5A:
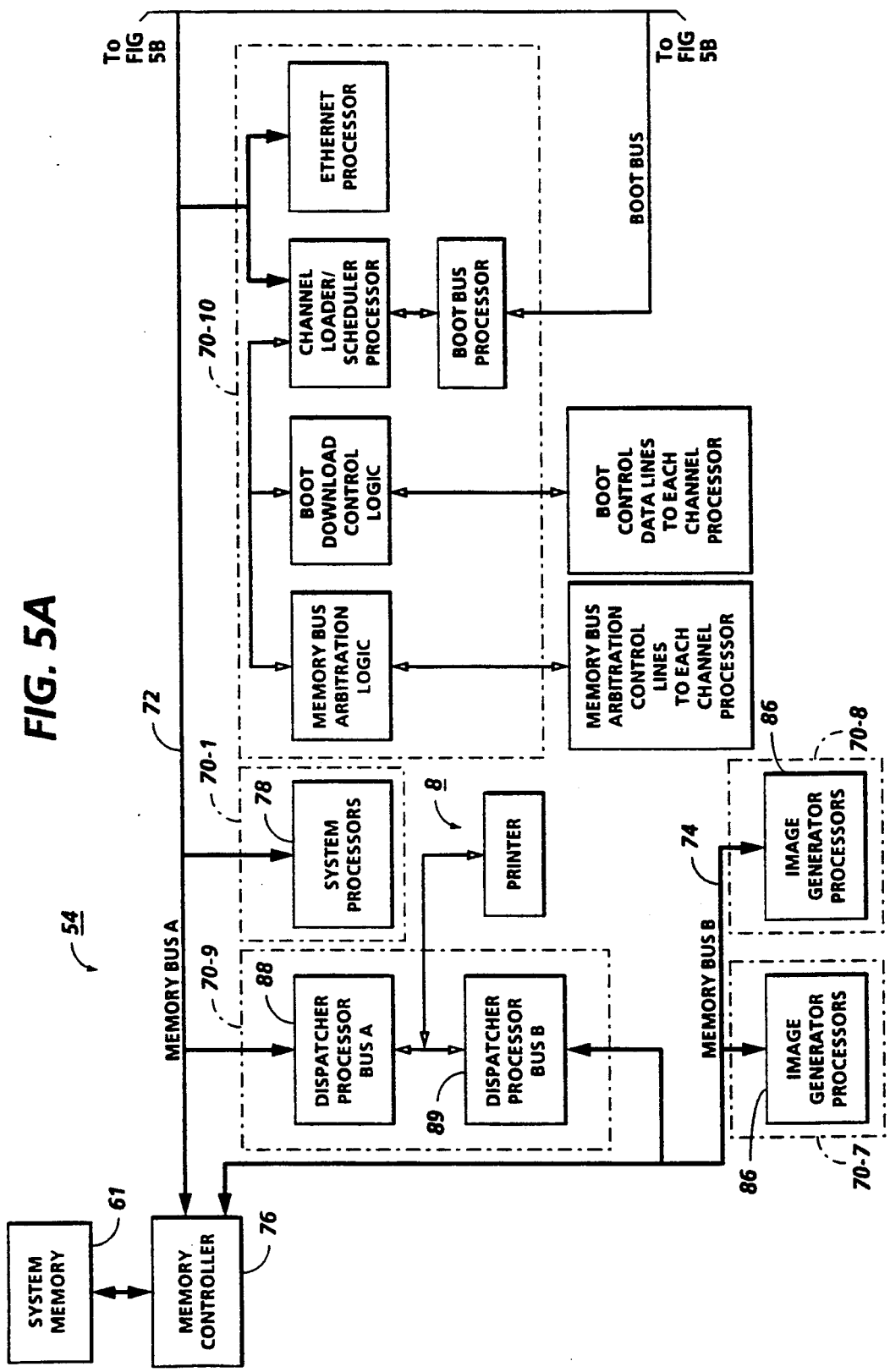
Figure 5B:
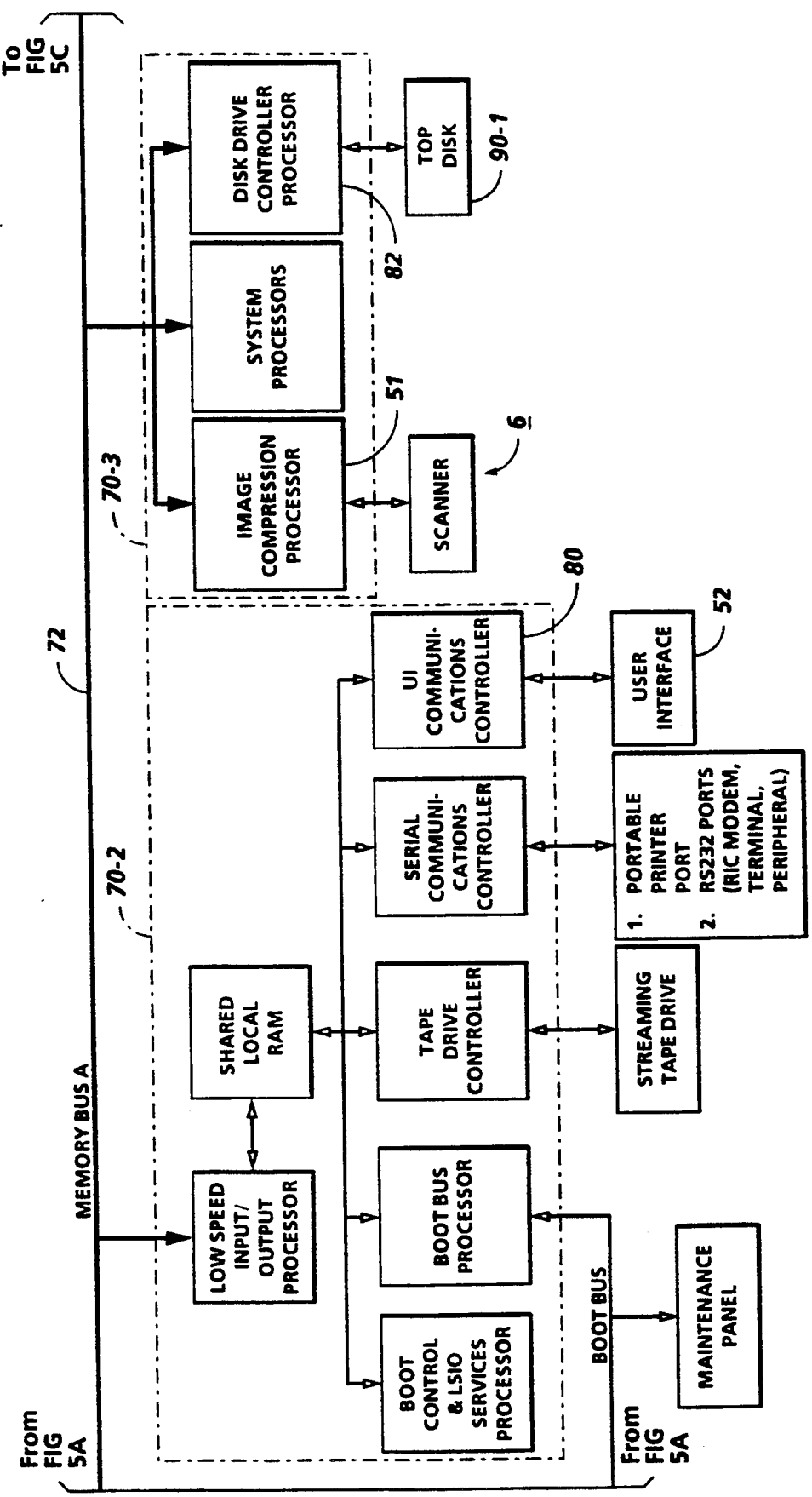
Figure 5B:
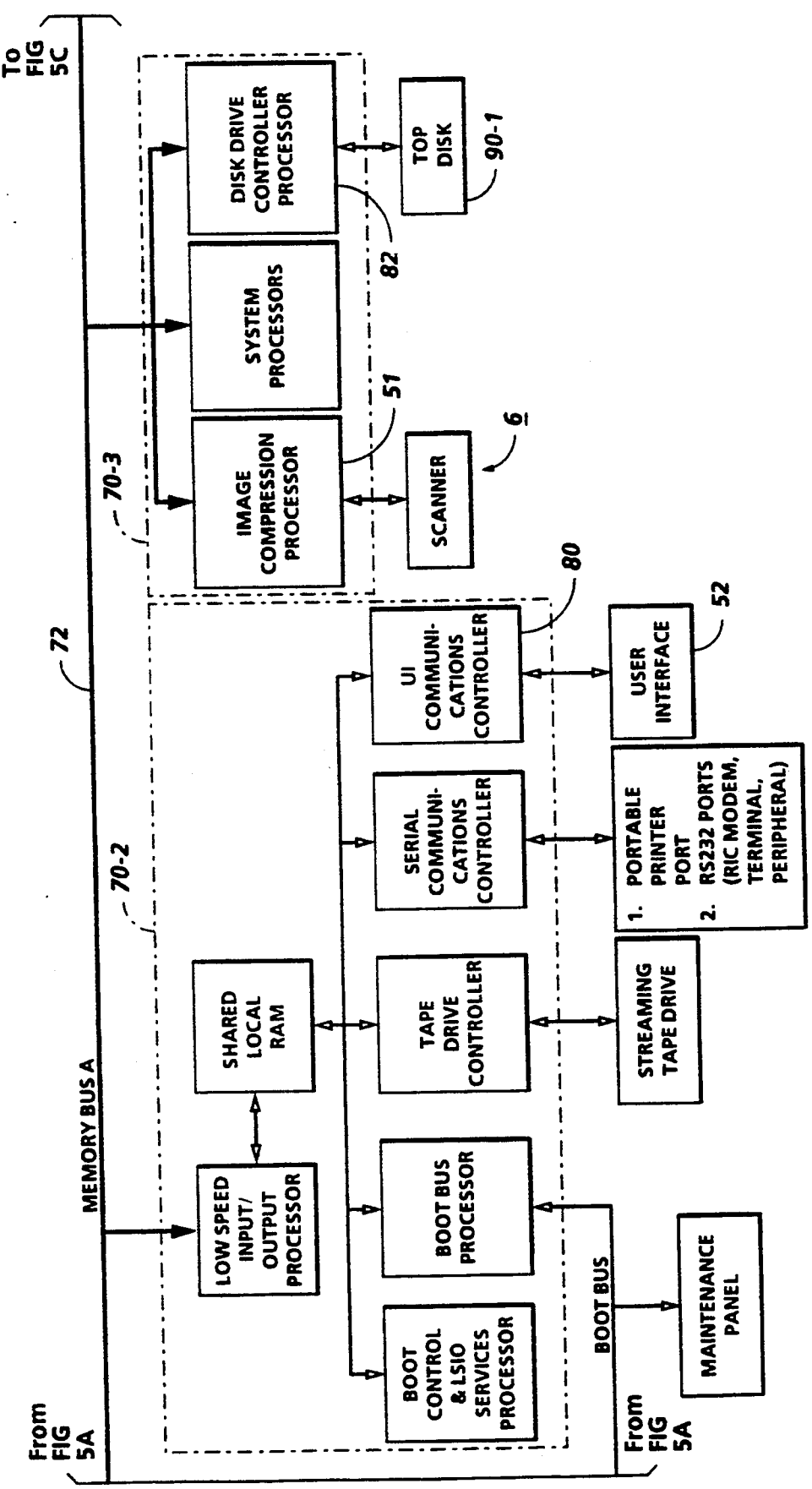

Referring to FIGS. 1, 2 and 5, controller section 7 is, for explanation purposes, divided into an image input controller 50, User Interface (UI) 52, system controller 54, main memory 56, image manipulation section 58, and image output controller 60.

Referring particularly to FIGS. 5A–5C, control section 7 includes a plurality of Printed Wiring Boards (PWB's) 70, PWB's 70 being coupled with one another and with System Memory 61 by a pair of memory buses 72,74. Memory controller 76 couples System Memory 61 with buses 72, 74. PWB's 70 include system processor PWB 70-1 having plural system processors 78; low speed I/O processor PWB 70-2 having UI communication controller 80 for transmitting data to and from UI 52; PWB's 70-3, 70-4 and 70-5 having disk drive controller/processors 82 for transmitting data to and from disks 90-1, 90-2 and 90-3, respectively, of main memory 56 (image compressor/processor 51 for compressing the image data is on PWB 70-3); image manipulation PWB 70-6 with image manipulation processors of image manipulation section 58; image generation processor PWB's 70-7 and 70-8 with image generation processor 86 for processing the image data for printing by printer section 8; dispatch processor PWB 70-9 having dispatch processors 88 and 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice printers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RJLM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc., are carried out. Following processing, the data may be returned to main memory 56, sent to UI 52 for display on touchscreen 62, or sent to image output controller 60.

Image data output to image output controller 60 is decompressed and readied for printing by image generating processors 86 of PWB's 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 6:
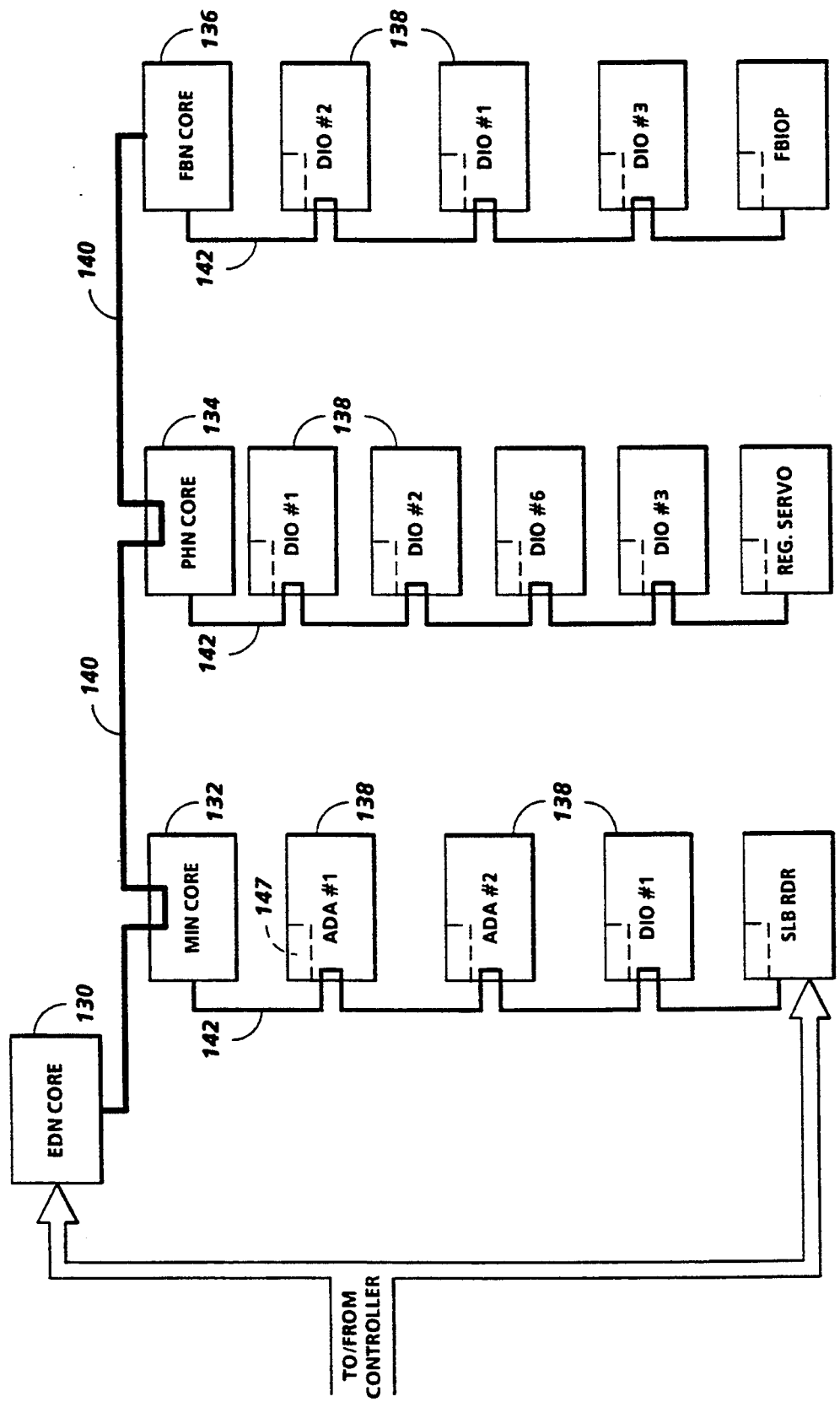
FIG. 6 is a block diagram of an Operating System, together with Printed Wiring Boards and shared line connections for the printing system shown in FIG. 1.

Referring particularly to FIG. 6, system control signals are distributed via a plurality of printed wiring boards (PWB's). These include EDN core PWB 130, Marking Imaging core PWB 132, Paper Handling core PWB 134, and Finisher Binder core PWB 136 together with various Input/Output (I/O) PWB's 138. A system bus 140 couples the core PWB's 130, 132, 134 and 136 with each other and with controller section 7 while local buses 142 serve to couple the I/O PWB's 138 with each other and with their associated core PWB.

On machine power up, the Operating System software is loaded from memory 56 to EDN core PWB 130 and from there to the remaining core PWB's 132, 134 and 136 via bus 140, each core PWB 130, 132, 134, 136 having a boot ROM (not shown) for controlling downloading of Operating System software to the PWB, fault detection, etc. Boot ROMs also enable transmission of Operating System software and control data to and from PWB's 130, 132, 134 and 136 via bus 140 and control data to and from I/O PWB's 138 via local buses 142. Additional ROM, RAM, and NVM memory types are resident at various locations within system 2.

Figure 7:
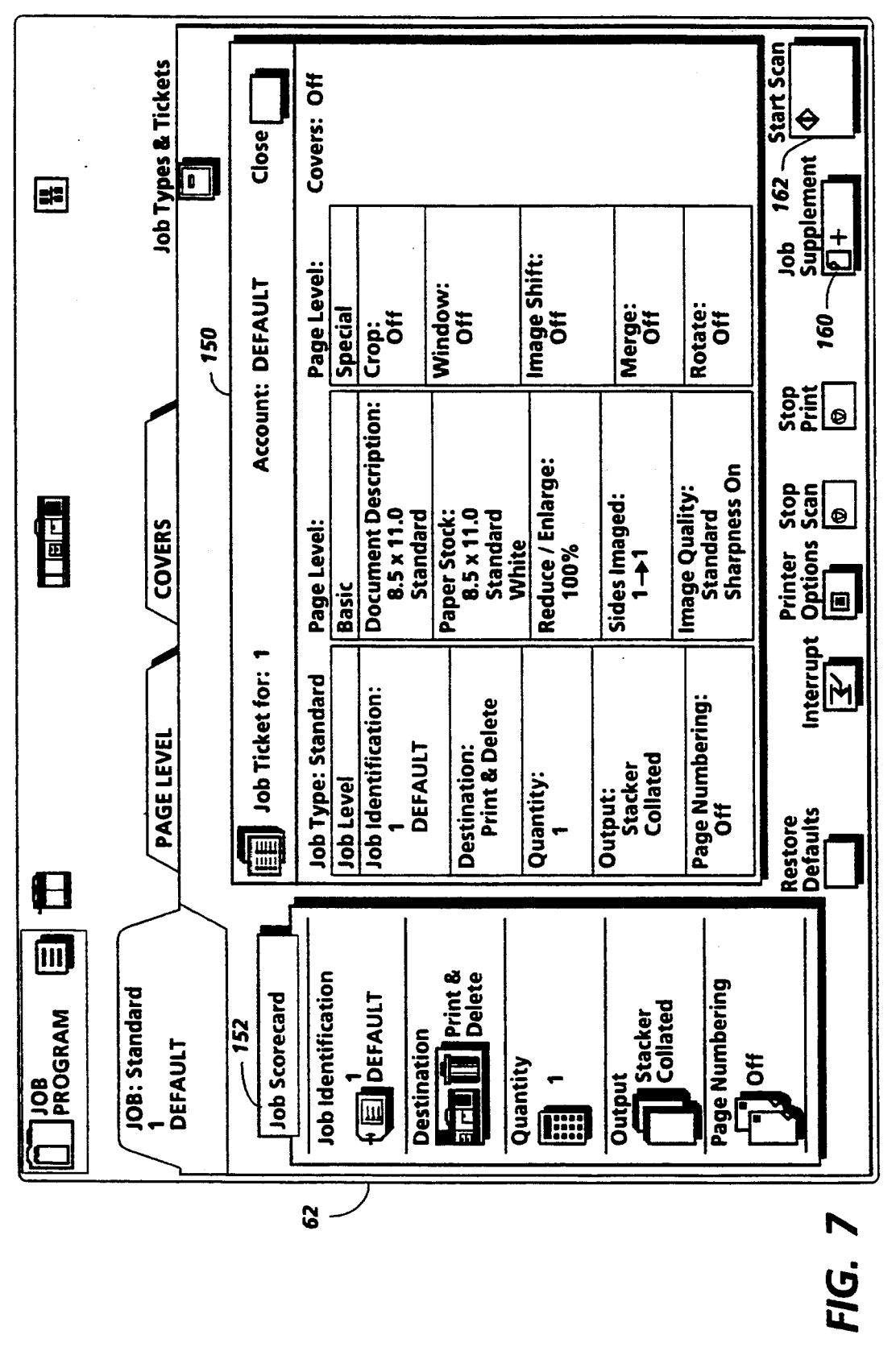

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

B. Operation Upon scan Interruption

Figure 8A:
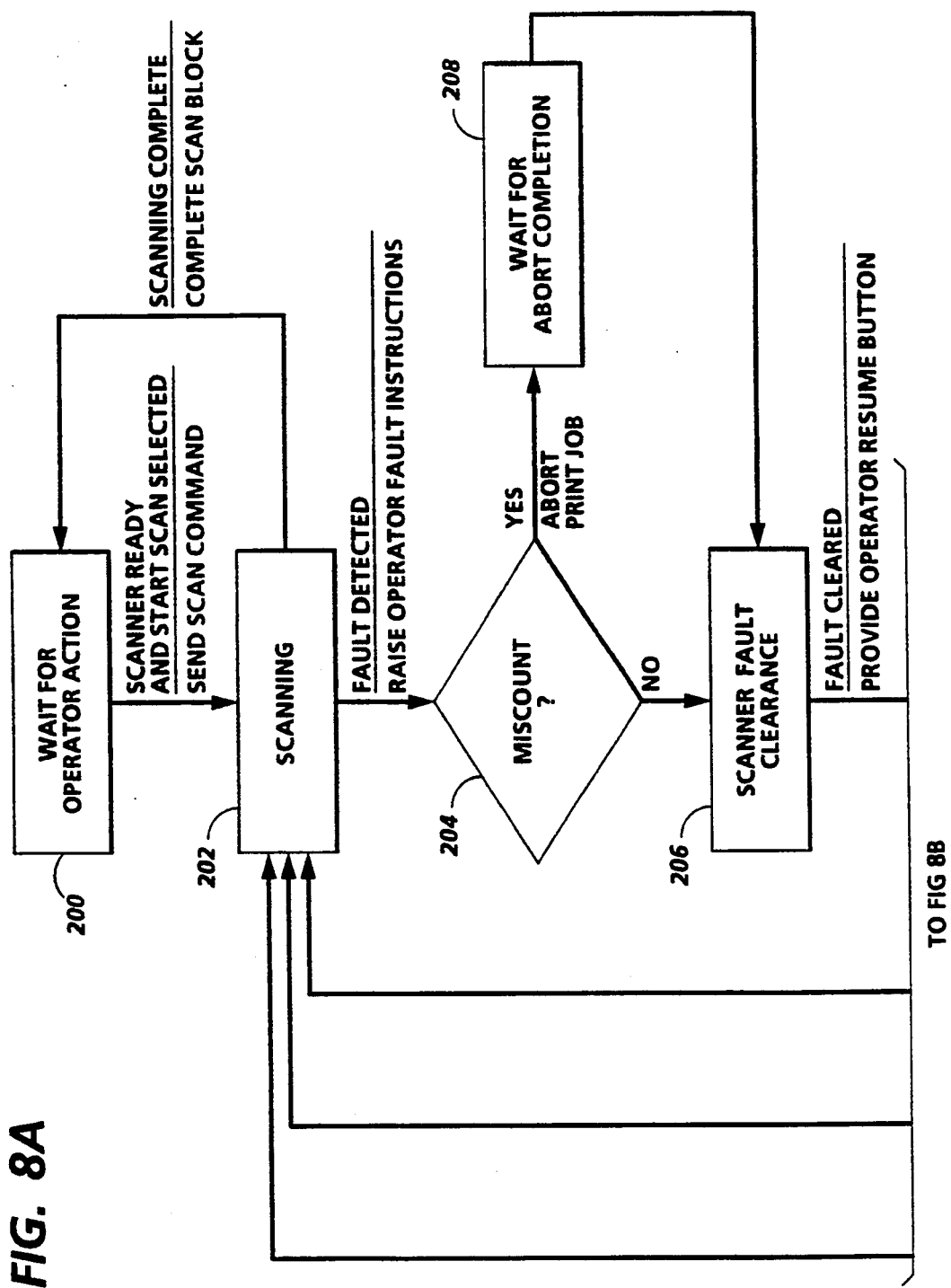
FIGS. 8A and B is a flowchart depicting the operation of the FIG. 1 system according to the present invention.
Figure 8B:
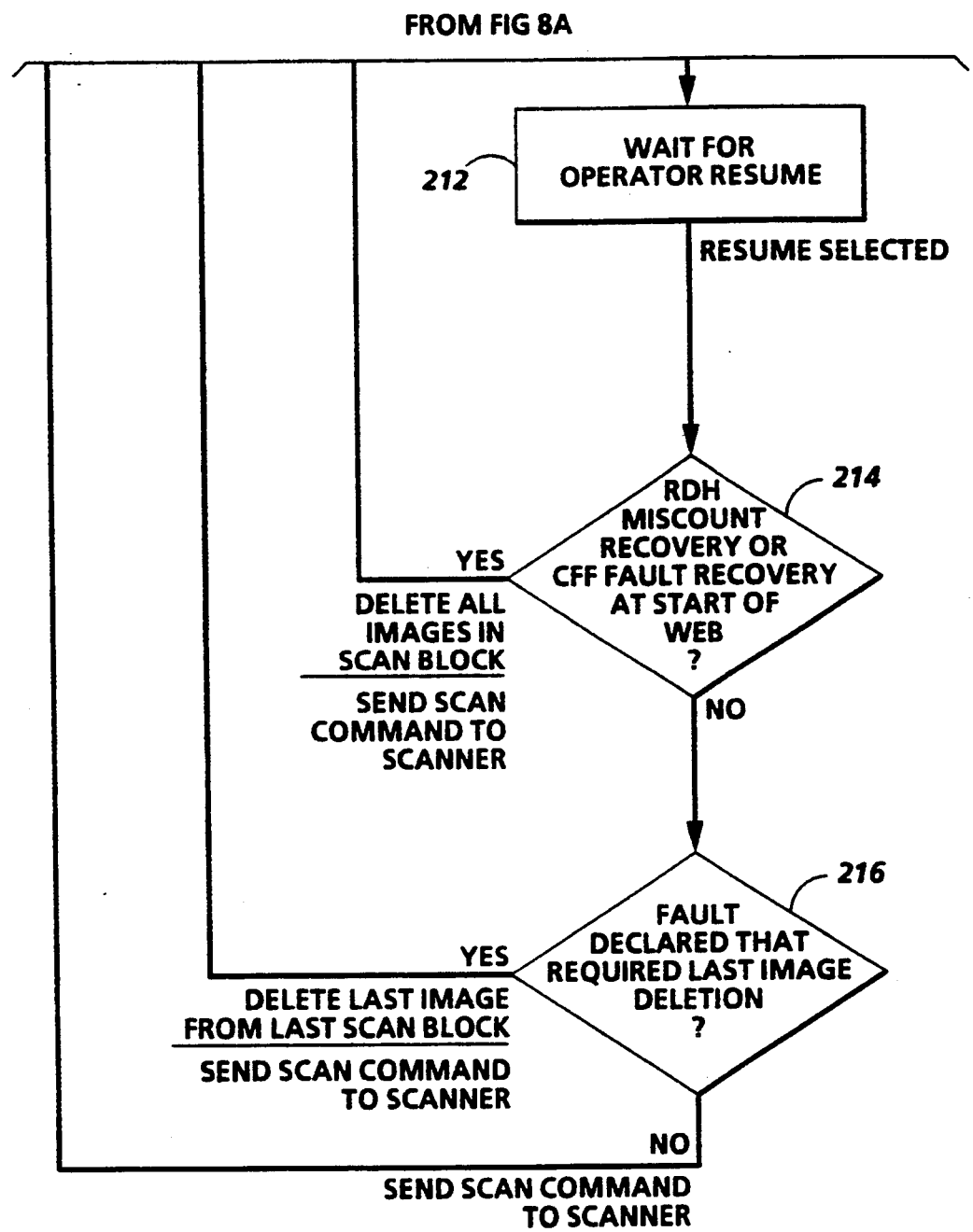

Referring to FIG. 8, there is shown a flowchart depicting operation of system 2 according to the present invention.

System 2 waits for operator action at user interface 52 (Step 200). Once an indication is provided that scanner 6 is ready and Start Scan has been selected by the operator, a scan command is sent to initiate scanning (Step 202). Scanning normally continues until a scan block is complete, at which time operator action can again be instituted. If, however, a fault is detected by system 2, operator fault instructions are raised at interface 52. System 2 determines whether a miscount has occurred (Step 204). If a miscount has not occurred, interface 52 displays instructions for scanner fault clearance (Step 206). If a miscount has occurred, the print job is aborted. System 2 waits for the completion of the print job abort (Step 208). Once the abort is completed, interface 52 displays instructions for scanner fault clearance (Step 206). After clearance of the fault by the operator in response to the displayed instructions, the operator selects a "Resume" button. The system 2 waits for and responds to the "Resume" instruction (Step 212). Once the "Resume" feature is selected by the operator, system 2 determines whether there has been an RDH miscount recovery or a CFF fault recovery at the start of the fanfold web (Step 214). If system 2 determines that either of these recoveries has occurred, all images in the last scan block are deleted. A command is sent to scanner 6 to initiate scanning (Step 202). If either of these recoveries has not occurred, system 2 determines whether a fault was declared that required last image deletion (Step 216). If so, the last image from the last scan block is deleted, and a command is sent to scanner 6 to initiate scanning (Step 202). If no fault was declared that required last image deletion, a command is sent to scanner 6 to initiate scanning (Step 202).

Copending U.S. application Ser. No. 07/589,541, now U.S. Pat. No. 5,148,286 (JAO 26234) describes a crash recovery operation which will return the system elements to a functional state after a crash has occurred. During recovery, the initial cause of the crash (i.e., the fault) must be cleared. Whenever possible, the first attempt at recovery will be automatic, with no operator intervention, and without impact to the other system elements. If assistance is required, it will be at the operator level. If a hardware failure is detected during the system self-test, a fault code will be displayed at UI 52 to alert the operator that a service call is in order.

The present invention provides improved recovery from scanner faults by enabling deletion of images scanned during occurrence of a scanner fault. This ensures that the documents have been scanned correctly and accurately, this being crucial since documents are scanned only once to create a job in system 2. The image deletion provides improved output quality since certain scanner faults such as misfeeds indicative of incorrect document registration result in image deletion, thereby resulting in proper image placement. The recovery procedures are consistent since the operator is always instructed on where and how to refeed a document. The operator is not required to remove sheets from the paper path, determine whether the sheet was scanned or not and determine where the sheet should be placed. The job integrity is improved since faults such as multifeeds result in image deletion for recapture of the images for the job.

While this invention has been described in conjunction with specific embodiments thereof, it is evident that many alternatives, modifications and variations will be apparent to those skilled in the art. For example, image deletion can be used for certain fan fold faults occurring on the first few panels of a fan-fold web. The operator can simply pull the forms back out from an input slot and refeed the entire web. Accordingly, the preferred embodiments of the invention as set forth herein are intended to be illustrative, not limiting. Various changes may be made without departing from the spirit and scope of the invention as defined in the following claims.

What is claimed is:

1. A method of scanner interruption recovery in an electronic reprographic printing system having a scanner for scanning documents that comprise a job to be scanned, a converter for converting the scanned documents to electronic images, a memory for storing the electronic images, and a printer, the method comprising the steps of:

monitoring the scanner for any interruption in scanning prior to completion of scanning of the without displaying said electronic images;

upon detection of an interruption in scanning, determining which electronic images correspond to a scanned document involved in the scanning interruption; and deleting from said memory said electronic images corresponding to said scanned document involved in the scanning interruption determined in said determining step.

2. The method as recited in claim 1, further comprising the steps of:

displaying refeed instructions for refeeding the documents whose images were deleted; and upon document refeed, rescanning the documents whose images were deleted.

3. The method as recited in claim 1, further comprising the step of determining whether a miscount of the number of scanned documents has occurred during scanning and, if a miscount has occurred, automatically aborting a print job in progress.

4. The method as recited in claim 1, further comprising the step of displaying instructions for clearance of monitored interruptions.

5. An apparatus for scanner interruption recovery in an electronic reprographic printing system having a scanner for scanning documents that comprise a job to be scanned, a converter for converting the scanned documents to electronic images, and a memory for storage of the electronic images, the apparatus comprising:

monitoring means for monitoring the scanner for any interruption in scanning prior to completion of scanning of the job without displaying said electronic images;

means for determining which electronic images correspond to a scanned document involved in the scanning interruption; and deleting means for deleting from said memory said electronic images corresponding to said scanned document determined by said determining means.

6. The apparatus as recited in claim 5, further comprising:

display means for displaying refeed instructions for refeeding the documents whose images were deleted; and scanning means for rescanning the documents whose images were deleted, said scanning means operating upon document refeed.

7. The apparatus as recited in claim 3, further comprising determining means for determining whether a miscount of the number of scanned documents has occurred during scanning; and abort means for automatically aborting printer operation in response to a determination that a miscount has occurred.

8. The apparatus as recited in claim 3, further comprising display means for displaying instructions for clearance of monitored interruptions.

* * * * *